United States Patent [19]

Luscombe

[11] Patent Number: 4,552,224
[45] Date of Patent: Nov. 12, 1985

[54] HITCH ASSEMBLY FOR A TANDEM DISC IMPLEMENT

[76] Inventor: Terry Luscombe, P.O. Box 108, Armstrong, Iowa 50514

[21] Appl. No.: 590,735

[22] Filed: Mar. 19, 1984

[51] Int. Cl.⁴ .......................... A01B 69/00; B60D 1/14
[52] U.S. Cl. .................................... 172/324; 280/463; 172/595
[58] Field of Search ............... 172/324, 325, 315, 316, 172/580, 579, 594, 595; 280/462, 463

[56] References Cited

U.S. PATENT DOCUMENTS

| | | | |
|---|---|---|---|
| 1,175,003 | 3/1916 | Michel | 172/324 X |
| 2,610,455 | 9/1952 | Oehler | 172/580 |
| 2,771,306 | 11/1956 | Ash | 172/580 |
| 2,857,724 | 10/1958 | Kenney | 172/316 |
| 3,003,789 | 10/1961 | Calkins | 172/457 X |
| 4,123,081 | 10/1978 | Ellinger | 280/463 |

Primary Examiner—Richard J. Johnson
Attorney, Agent, or Firm—Herman H. Bains

[57] ABSTRACT

A tandem disc implement is provided with a hitch assembly for interconnecting the implement in articulated, trailing relation with respect to a tractor. The hitch assembly includes a draw bar which is pivotally connected to the tractor and is shiftably connected to the hitch frame of the hitch assembly. In one embodiment, the draw bar is pivotally connected to the hitch frame and is shifted between in-line and angulated relation with respect to the implement. In another embodiment, the draw bar is translated laterally from an in-line position to a laterally offset position. Shifting of the draw bar permits the implement to be towed in trailing tandem relation or, alternatively, in offset relation with respect to the tractor.

2 Claims, 6 Drawing Figures

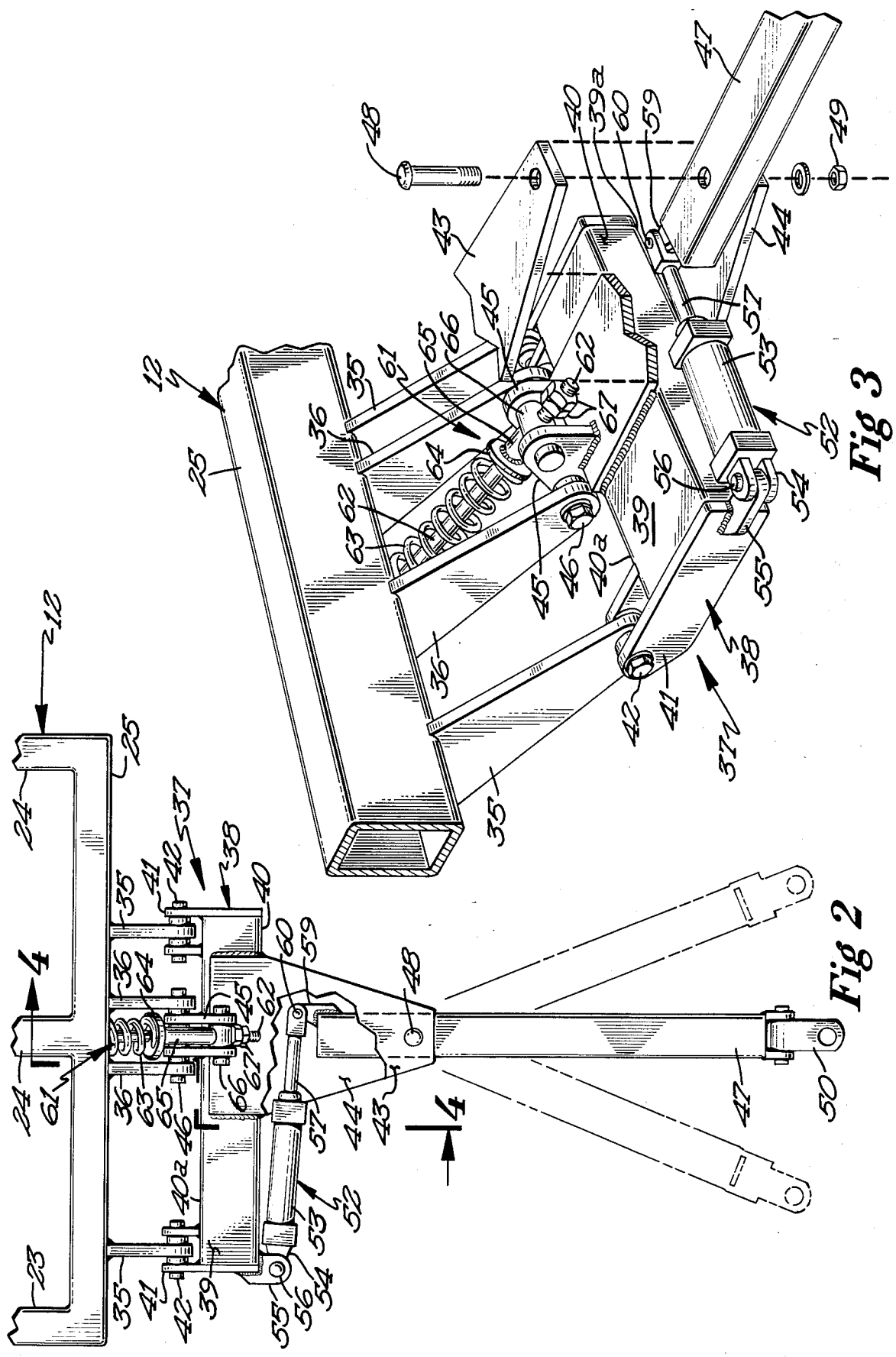

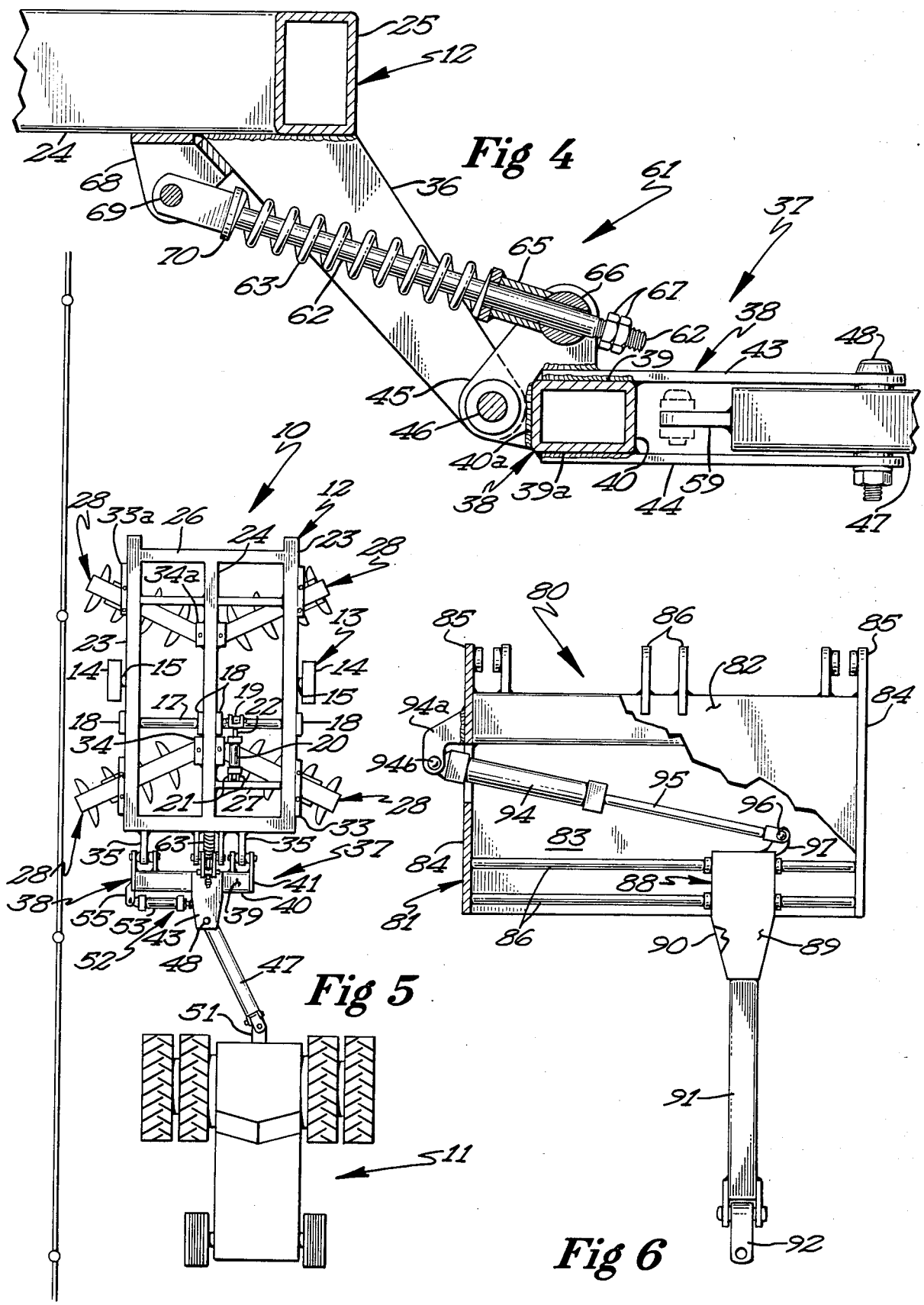

HITCH ASSEMBLY FOR A TANDEM DISC IMPLEMENT

SUMMARY OF THE INVENTION

This invention relates to a mobile disc implement, and more particularly to a towable disc implement having an adjustable hitch assembly.

There are many types of disc plow implements which are towed by a tractor during the plowing operation. However, two of the more conventional commercial types of disc plow implements include the offset and tandem types. In the offset type, the disc gangs are offset with respect to the direction of travel, and the entire implement is also offset with respect to the longitudinal center line of the tractor. While an offset disc plow implement allows an operator to plow close to the borders of a field, the power requirements for towing the offset disc implement are substantially greater than the power requirements for towing a tandem disc implement. In the tandem disc implement, the disc gangs are oppositely angled but are arranged in tandem relation with respect to each other. Further, the tandem disc implement is towed directly behind the tractor to maximize the towing efficiency of the tractor. However, because of the width of the tractor it is often difficult, if not impossible, to plow closely adjacent the field border with the tandem disc implement.

It is an object of this invention to provide a tandem disc implement with a novel hitch assembly which may be actuated to substantially align the disc implement behind the tractor or, alternatively, may be actuated to offset the tandem disc implement with respect to the tractor and thereby permit plowing adjacent a fence or the like.

Another object of this invention is to provide a tandem disc implement with an adjustable hitch mechanism including a hitch frame having a double acting hydraulic cylinder mounted thereon which is connected to the towing draw bar for adjusting the latter between an in-line and angled relation with respect to the towing tractor.

These and other objects and advantages of my invention will appear more fully from the following description made in conjunction with the accompanying drawings wherein like reference characters refer to the same or similar parts throughout the several views.

FIGURES OF THE DRAWING

FIG. 2 is a top plan view of the front portion of the implement illustrating the novel hitch assembly with certain parts broken away for clarity;

FIG. 3 is a perspective view of the novel hitch assembly with certain parts broken away and exploded to more fully illustrate relationship of the various components;

FIG. 4 is a cross-sectional view taken approximately along line 4—4 of FIG. 2 and looking in the direction of the arrows;

FIG. 5 is a diagrammatic top plan view of the implement illustrated in towed relation with respect to a tractor; and FIG. 6 is a top plan view of a different embodiment of the novel hitch assembly with certain parts thereof broken away for clarity.

DESCRIPTION OF THE PREFERRED EMBODIMENT

Figure 1:
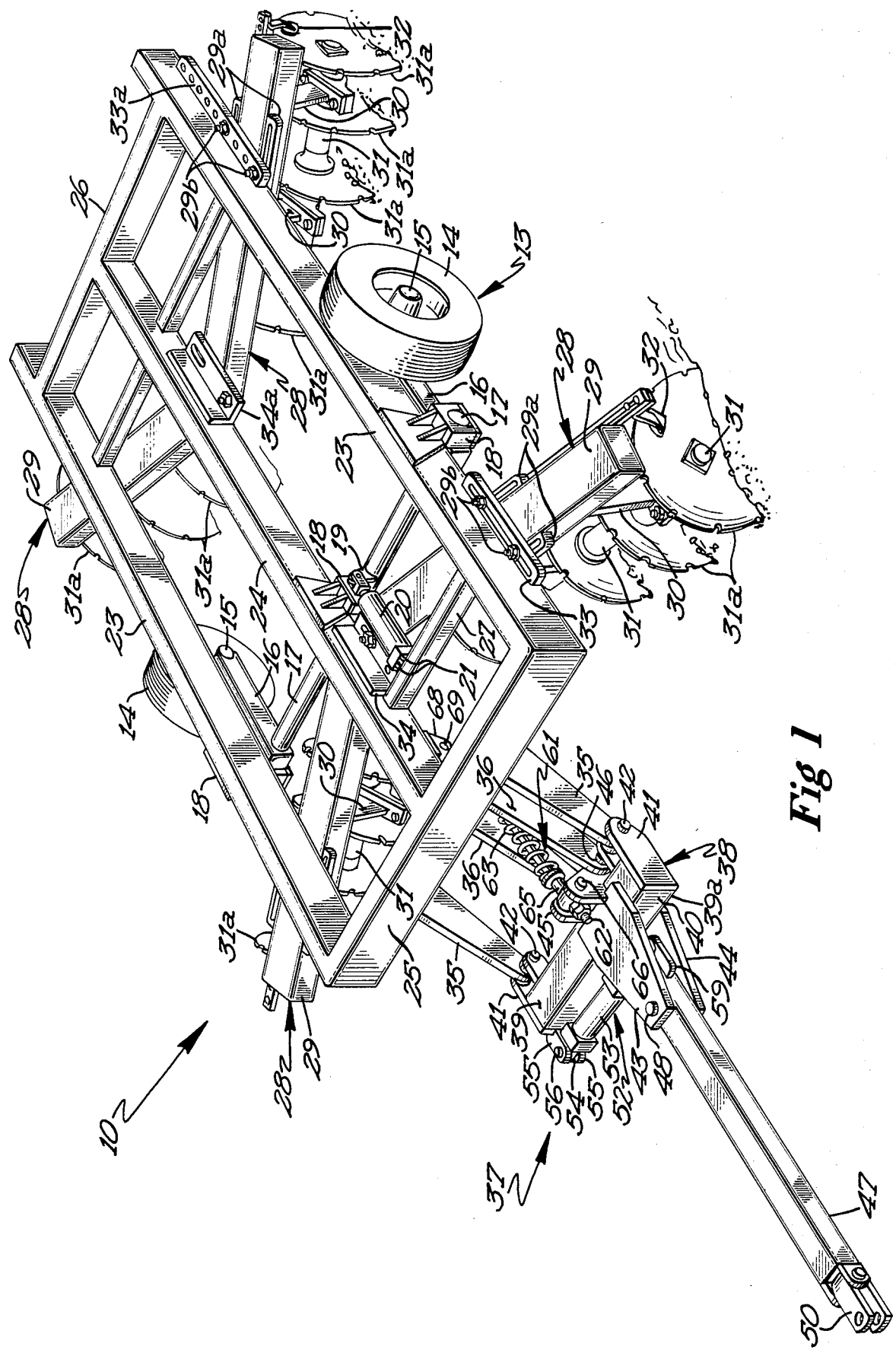
FIG. 1 is a front perspective view of a tandem disc implement having the novel hitch assembly incorporated thereon.

The novel hitch assembly is used in conjunction with a tandem disc plow implement, designated generally by the reference numeral 10, and connected in articulated relation with respect to a tractor 11. The tandem disc implement 10 includes a generally elongate, rectangular shaped implement frame 12 which is provided with a ground wheel assembly 13. The ground wheel assembly 13 is vertically shiftable between a raised, inoperative and a lowered, operative position. The ground engaging wheel assembly includes a pair of ground engaging wheels 14 located on opposite sides of the implement frame 12, and each being provided with a stub axle 15 journaled in the offset end portion 16 of an elongate rock shaft 17. The rock shaft 17 is journaled in suitable bearings 18 to permit rotation of the rock shaft about its longitudinal axis.

The rock shaft 17 has a rock arm 19 affixed thereto adjacent one side thereof. An hydraulic ram cylinder 20 is secured to a pair of spaced apart brackets 21 mounted on the implement frame 12. The piston rod 22 of the hydraulic ram cylinder 20 is pivotally connected to the rock arm 19 so that extension and retraction of the piston rods rotates the rock shaft and shifts the wheel assembly between the raised and lowered positions.

The implement frame is comprised of a pair of elongate, longitudinally extending outer frame elements 23 and an elongate, longitudinally extending inner frame element 24. These inner and outer longitudinal frame elements are rigidly secured to an elongate front transverse frame element 25 and an elongate rear transverse frame element 26. A front transverse frame element 27 is rigidly interconnected with the inner longitudinal frame element 24 and one of the outer frame elements 23. It will be noted that the brackets 21 which support the hydraulic ram cylinder 20 are secured to the front transverse frame element 27. A pair of rear transverse frame elements 27a interconnect the inner longitudinal frame element with the outer longitudinal frame element.

The implement frame 12 supports a plurality of disc gangs 28 which are of generally conventional construction and operation. It will be noted that the gangs include a pair of front disc gangs and a pair of rear disc gangs. Each disc gang 28 includes an elongate, horizontally disposed tool bar 29 having a pair of laterally spaced apart, vertically disposed brackets or standards 30 secured thereto and depending therefrom adjacent opposite ends thereof. An elongate axle 31 has its opposite ends journaled in the brackets 30, and revolvably mounts a plurality of discs 31a thereon. Each disc is provided with a disc cleaning tool 32 mounted on a standard which is secured to the tool bar 29. The entire disc gang is of conventional construction and does not, per se, constitute a part of the present invention.

Each tool bar 29 has a pair of slotted brackets 29a secured to opposite sides thereof. A pair of front slotted brackets 33 are each affixed to one of the outer longitudinal frame elements 23 adjacent the front end thereof. A pair of rear apertured brackets 33a are each affixed to one of the outer longitudinal frame elements 23 adjacent the rear end thereof. A pair of apertured front angle brackets 34 are secured to opposite sides of the inner longitudinal frame member 24 adjacent the front end thereof. A pair of apertured rear angle brackets 34a are secured to opposite sides of the inner longitudinal frame element 24 adjacent the rear end thereof. Studs 29b extend through the slotted brackets 33 and angled brackets 34 to adaptably mount the disc gangs on the implement frame. These slotted and apertured brackets for each disc gang permit adjustment of the angulated relation of each gang relative to the direction of travel.

It will be seen that the implement frame 12 has a pair of outer brackets 35 affixed to the front transverse frame element 25 thereof and projecting downwardly and forwardly therefrom. A pair of laterally spaced apart inner brackets 36 also rigidly affix to the front transverse frame element 25 and project forwardly and downwardly therefrom. The inner and outer brackets are disposed in parallel relation with respect to each other, and are pivotally connected to a hitch assembly 37, as best seen in FIG. 4.

The hitch assembly 37 includes a hitch frame 38 of rectangular beam construction including a substantially flat upper plate 39, a lower plate 39a, front plate 40, rear plate 40a and generally vertically disposed side plates 41. It will be seen that the rear end portions of the side plates 41 project rearwardly beyond the upper and lower plates and are pivotally connected by pivot pins 42 to the apertured front end portions of the outer brackets 35 to permit vertical pivoting of the hitch frame about a horizontal transverse axis.

The hitch frame 38 also includes a substantially flat, generally triangular shaped upper bracket plate 43 which is rigidly secured to the upper plate 39 by welding, and projects forwardly therefrom. The hitch frame 38 also includes a substantially flat, generally rectangular shaped lower bracket plate 44 which is rigidly affixed to the lower plate 40 and projects forwardly therefrom. The rear end portions of the bracket plate are provided with a pair of laterally spaced apart ears 45 which are affixed thereto and project upwardly and forwardly therefrom. The ears are apertured and are pivotally connected by pivots 46 to the forward ends of the inner brackets 36. The pivotal axis defined by the pivot pins 42 and 46 are disposed in coaxial relation with respect to each other.

It will be noted that the forward ends of the upper and lower bracket plates 43 and 44, respectively, are apertured, and these apertures are disposed in registering relation with an aperture in the rear end portion of an elongate, forwardly projecting draw bar 47. A pivot pin 48 pivotally interconnects the draw bar to the upper and lower brackets, and the pivot pin is retained in place by retainer 49 which is in the form of an internal threaded nut. The draw bar 47, which is of elongate, straight configuration, is connected at its front end by a clevis connection 50 to the tractor hitch 51. The clevis connection permits pivoting of the draw bar relative to the tractor about a vertical as well as a horizontal axis to define, in effect, a universal connection. The pivotal connection between the draw bar 47 and the hitch frame 38 permits horizontal pivoting therebetween about a vertical axis.

It will be noted that the pivotal axis between the draw bar 47 and the hitch frame lies in the general longitudinal center line of the tandem disc plow implement 10. With this arrangement, the tandem disc implement 10 would normally trail directly behind the tractor 11 so that the draw bar 47 would also be disposed in the longitudinal center line of the implement and the tractor. However, means are provided for shifting and retaining the rear end portion of the draw bar relative to the hitch frame to dispose the draw bar in angulated relation relative to the respective longitudinal center lines of the implement and tractor.

This means includes a hydraulic ram unit 52 including a hydraulic cylinder 53 having ears 54 on the rear end thereof which are suitably apertured and which are connected to an ear 55 projecting forwardly from one of the side plates 41 of the hitch frame 38. A pivot pin 56 pivotally connects the ears of the hydraulic cylinder 53 to the ear 55 on the hitch frame to permit relative horizontal pivoting therebetween about a vertical axis. The ram unit 52 is provided with a piston rod 57 which projects therefrom, and the forward end of the piston rod 57 has a pair of ears 58 affixed thereto. The ears 58 on the piston rod 57 are pivotally connected to an ear 59 on the draw bar 47 by a pivot pin 60. It will be noted that the ear 59 affixed to the draw bar projects rearwardly therefrom and that the pivot pin 60 is vertically disposed to permit horizontal pivoting movement between the draw bar and piston rod 57 about a substantially vertical axis.

During the plowing operation, the rear gangs of plows have a tendency to ride upwardly out of the ground while the front gangs have a tendency to dig into the ground. In order to assure substantially uniform depth control, the tandem disc implement 10 is provided with a spring mechanism 61 which tends to urge the rear end portion of the implement downwardly. Referring now to FIG. 5, it will be seen that the spring mechanism 61 includes an elongate rod 62 having a helical coil spring 63 positioned therearound. The front end portion of the helical spring engages a collar 64 affixed to a sleeve 65 which is positioned around the rod. The front end of the rod 62 projects through openings in a tubular element 66 which is mounted within apertures in the ears 45. The front end of the rod 62 is threaded and has retaining nuts 67 affixed thereto to prevent disengagement of the rod from the tubular element 66. The rear end of the rod is pivotally connected to a pair of ears 68 affixed to the frame 12 by a pivot pin 69. A slidable collar 70 is positioned around the rod 62 and is engaged by the rear end of the spring 63. The collar 70 is urged against the ears 68 of the frame, and sleeve 65 is urged against the tubular element 66 of the hitch assembly. The reaction force of the spring mechanism against the implement frame stabilizes the latter and permits uniform depth control during the plowing operation.

In operation, the tandem disc implement will be towed by the tractor and the disc gangs will be arranged in the desired angulated relation with respect to the direction of travel to achieve the optimum ground preparation. During the normal plowing operation, the draw bar 47 will be positioned by the hydraulic ram unit 52 so that the draw bar will be positioned in substantially the longitudinal center line of the implement 10 and the tractor 11. The power requirements required for towing the tandem disc implement in trailing relation direction behind the plow are substantially less than the power requirements for towing the implement when it is positioned in offset relation with respect to the tractor. However, it will be necessary to offset the tandem disc implement to plow closely adjacent a field boundary such as the fence line illustrated in FIG. 5.

The operator will merely actuate the hydraulic ram unit 52 to shift the piston rod from the neutral position and to cause the rear end of the draw bar to be moved toward the left, as viewed in FIG. 5. This disposes the draw bar 47 in an angulated relation with respect to the center line of the implement and the center line of the towing tractor. The tandem disc implement may then be towed by the tractor so that plowing may be achieved closely adjacent the fence line. It will be further noted that the hydraulic ram retains the draw bar in this adjusted position until it is desirable to readjust the position of the draw bar.

Therefore, when the operator reaches the end of the field, the hydraulic ram unit 52 may be actuated to extend the piston rod and to again align the draw bar 47 so that it lies generally in the center line plane of the implement and the tractor. The tandem disc implement may be towed directly behind the tractor until the offset position is again required for plowing along a field boundary. This arrangement allows the operator to achieve efficiency in terms of power requirements during the normal plowing operation, but also allows the operator to regularly adjust the hitch mechanism to permit plowing closely adjacent a field boundary.

Reference is now made to FIG. 6 where a modified form of the novel hitch assembly, designated generally by the reference numeral 80, is thereshown. The hitch assembly 80 includes a generally rectangular shaped hitch frame 81 which is comprised of a top plate 82, a bottom plate 83, and opposed side plates 84. The side plates have rearward extensions which are pivotally connected by pivot 85 to the brackets 35 of the implement frame. The hitch frame is also provided with a pair of ears 86 to which the spring mechanism is connected.

The hitch frame is also provided with a pair of transversely extending, substantially straight, elongate slide rods 87 that extend between and are rigidly secured to the side plates 84. The slide rods are slidably engaged by a slide block 88 having suitable openings therethrough for accommodating the slide rods 87. The slide block 88 has an upper plate 89 and a lower plate 90 rigidly affixed thereto and projecting forwardly therefrom. An elongate, substantially straight draw bar 91 is rigidly affixed to the upper and lower plates and is connected by clevis hitch connection 92 at its forward end to the tractor hitch mounted on the tractor. Means are provided for shifting the slide block 88 along the slide rods 87, and this means includes a hydraulic ram 93 which includes an hydraulic cylinder 94 which is pivotally connected to a bracket 94a by a pivot 94b. It will be seen that the bracket 94a is rigidly affixed to one of the side plates 84 of the hitch frame. The piston rod 95 of the ram 93 is pivotally connected by a pivot 96 to an ear 97 affixed to the rear end of the slide block 88. Extension and retraction of the piston rod 95 causes the draw bar to be shifted laterally relative to the hitch frame 81 and permits the tandem disc implement to be offset relative to the center line of the towing tractor.

From the foregoing, it will be seen that I have provided a novel hitch mechanism which permits a tandem disc implement to be towed directly behind a tractor or, alternatively, permits the tandem disc implement to be angularly offset for plowing along the field boundary.

Thus it will be seen that I have provided a novel hitch assembly for a tandem disc implement, which is not only of simple and inexpensive construction, but one which functions in a more efficient manner than any heretofore known hitch assembly.

While the preferred embodiments of the present invention have been described, it should be understood that various changes, adaptions and modifications may be made therein without departing from the spirit of the invention and the scope of the appended claims.

What is claimed is:

1. A multiple tandem plow implement connectable to a tractor to be towed thereby, comprising:
   an elongate, generally rectangular-shaped implement frame extending in a fore and aft direction;
   a plurality of gangs of disc plows mounted on said frame, including a front pair of gangs and a rear pair of gangs, each frong gang being oppositely angled with respect to a gang positioned directly rearwardly thereof;
   a pair of vertically shiftable ground engaging wheels mounted on said frame and being shiftable between working and travel positions, said ground engaging wheels when in the travel position elevating the gangs of plows above the surface of the ground and when in the working position allowing plows to penetrate the ground;
   an elongate generally rectangular-shaped hitch frame positioned forwardly of and below said implement frame and extending transversely and substantially normal to the direction of travel, means pivotally connecting said hitch frame with the front end of said implement frame to permit vertical pivotal movement between the hitch frame and implement frame about a horizontal axis extending normal to the direction of travel, a pair of substantially flat vertically spaced apart substantially parallel plates secured to said hitch frame and projecting forwardly therefrom;
   an elongate draw bar extending in a fore and aft direction and having means at its forward end for pivotal connection with a tractor, said draw bar having a rear end portion positioned between said plates, pivot means adjacent the rear end of said draw bar pivotally connecting the draw bar to said plates to permit lateral shifting of the draw bar about a vertical axis relative to the hitch frame;
   a horizontally disposed double-acting horizontal ram positioned forwardly of said hitch frame and being extendable and retractable, pivot means pivotally connecting one end of said hydraulic ram to one end of said hitch frame for pivoting movement of the hydraulic ram relative to the hitch frame about a vertical axis, pivot means pivotally connecting the other end of said hydraulic ram to the rear end of the draw bar to permit various and selected power shifting of the rear end of the draw bar laterally with respect to the hitch frame in opposite directions between a neutral position and offset position, said draw bar when in the neutral position being disposed in the longitudinal center line of the implement frame to permit trailing the latter substantially in a line with a tractor, said draw bar when in an offset position being angled with respect to the longitudinal center line of the implement frame to permit the implement frame to travel in offset relation thereto, said hydraulic ram being operable to retain the draw bar in an adjusted neutral or offset position.

2. The tandem plow implement as defined in claim 1 wherein said hydraulic ram is pivotally connected to said draw-bar rearwardly of the pivotal axis between said draw bar and hitch frame.

* * * * *